United States Patent [19]

Bajulaz

[11] Patent Number: 4,841,811
[45] Date of Patent: Jun. 27, 1989

[54] MECHANICAL REDUCER

[75] Inventor: Roger Bajulaz, Chambesy, Switzerland

[73] Assignee: Reduto S.A., Fribourg, Switzerland

[21] Appl. No.: 56,469

[22] Filed: May 29, 1987

Related U.S. Application Data

[63] Continuation of Ser. No. 701,202, Feb. 13, 1985, Pat. No. 4,699,023.

[30] Foreign Application Priority Data

Mar. 2, 1984 [CH] Switzerland .......................... 1039/84

[51] Int. Cl.[4] .............................................. F16H 1/28
[52] U.S. Cl. ......................................... 74/804; 74/805
[58] Field of Search .................................. 74/804, 805

[56] References Cited

U.S. PATENT DOCUMENTS 3,190,149 6/1965 Gonfin ................................... 74/805
3,427,901 2/1969 Wildhaber .............................. 74/804

FOREIGN PATENT DOCUMENTS

2332842 1/1975 Fed. Rep. of Germany ........ 74/804

Primary Examiner—Dirk Wright
Attorney, Agent, or Firm—Young & Thompson

[57] ABSTRACT

It comprises a motor shaft (1); a driven member (5), revolving at different speeds; two reduction members (6, 7) comprising each a series of driving elements (10, 11). The two reduction members (6, 7) are coaxial between themselves and with respect to the motor shaft (1) and it comprises at least one rotor (12) driven by the motor shaft (1) comprising at least three pairs of actuating members (15, 16; 17, 18; 19, 20), one of the actuating members (15, 17, 19) of each pair cooperating with driving elements (10) of one of the reduction members (6), whereas the other actuating member (16, 18, 20) of each pair cooperates with driving elements (11) of the other reduction member (7). The relative rotative movement betwen the two reduction members (6, 7) is caused by an instantaneous rotation of the rotor (12), resting on one of the reduction members (6), around a point located on a line connecting the centers of rotation of the actuating members (15, 16) of the pair meshing with the corresponding driving elements (10, 11) and causing the driving of the other reduction member (7).

15 Claims, 4 Drawing Sheets

MECHANICAL REDUCER

This application is a continuation, of application Ser. No. 701,202, filed Feb. 13, 1985.

The present invention has for its object a mechanical reducer of the type presenting a motor shaft and a driven member which are coaxial, revolving at different angular as a function of the reduction ratio of the reducer and comprising a first and a second coaxial reducing members angularly displacable the one with respect to the other, comprising each a series of driving elements uniformly distributed about the axis of rotation of the corresponding reducing member.

There are such mechanical reducers such as the "CYCLO" reducers or "GLEITKEILGETRIEBE" which however do not give full satisfaction in all the applications particularly when it is necessary to realize reducers without play.

In fact in the "CYCLO" reducer type the reduction is obtained through a disc shaped cam driven by an eccentric, this disc-shaped cam presenting at its periphery a number of cycloïdal curvatures of one unit less than the number of rollers pivoted on a fixed external sleeve, with which this periphery is in contact. The transmission of the rotation of the disc-shaped cam to the driven member is made by the intermediary of rollers pivoted on a plate and cooperating with holes of greater diameter of the disc-shaped cam uniformly distributed around its center.

Such a reducer necessitates complicated machinings particularly for the realization of the peripheral surface of the disc-shaped cam, and a great number of contact points between the disc-shaped cam and the fixed sleeve. This type of reducer do not permit to obtaining numerous different reduction ratios. Furthermore, with only one stage it is not possible to realize high reduction ratios without necessitating a reducer of great size.

In the type of "GLEITKEILGETRIEBE" reducer a disc which is toothed at its periphery is driven by an eccentric in such a way that its toothing meshes with the toothings of a fixed toothed crown as well as with a movable toothed crown. The number of teeth of this toothed crown is different so that the introduction of one tooth of the disc between two adjacent teeth of the two crowns causes an angular relative displacement of these two crowns.

The drawback of this type of reducer is the relatively great size and above all the sliding movement which the teeth of the disc makes on the sides of the teeth of the crowns.

There are finally gearing reducers which even by using a satellite pinion are cumbersome and do not permit the realization of whole reduction ratios which is particularly important in robotics.

The present invention provides a mechanical reducer having a small size a precise angular definition between the input and output shafts, permitting numerous reduction ratios which are not fractional with only one stage and the manufacture of which involves only simple machinings which can be preformed with a great precision.

The present reducer permits also limiting the points in contact in movable order to limit the wear as well as the losses by friction.

The mechanical reducer according to the invention distinguishes itself through the characteristics enumerated at claim 1.

The attached drawings show schematically and by way of examples, several embodiments of the reducer according to the invention.

The first embodiment of the reducer shown in FIGS. 1 to 9 comprises a motor shaft 1 pivoted in two bearings 2, 3 one of which is provided in a housing 4 of the reducer and the other one in a hub of the output shaft 5. The motor shaft 1 and the output shaft 5 are coaxial and revolve at angular speeds depending from the reduction ratio of the mechanical reducer.

Figure 1:
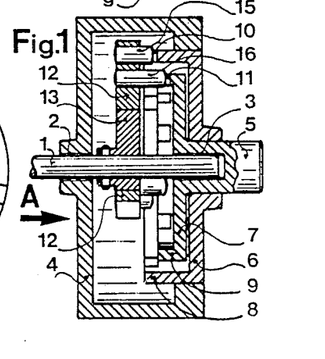
FIG. 1 is an axial cross section of a first embodiment of the reducer.
Figure 2:
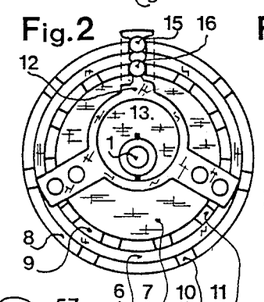
FIG. 2 is a view from A of the reducer shown in FIG. 1, the housing being omitted.

This mechanical reducer comprises further a bearer reduction member 6 and a driven reduction member 7 coaxial with each other and with the motor shaft 1.

In the example shown the bearer reduction member 6 is fixed, fast with the housing 4, whereas the driven reduction member 7 is fast with the output shaft 5.

Each of the reduction members 6, 7 comprises an annular crown 8 respectively 9 which are concentric and have different diameters.

Each of the crowns 8, 9 comprises a series of driving elements, here constituted by notches 10, respectively 11, uniformly distributed around the axis of rotation of the corresponding reduction member 6, 7.

In this particular embodiment, the driven reduction member 7, that is the internal crown 9, comprises eleven notches 11, whereas the bearer reduction member 6, that is the outside crown 8, comprises seven notches 10.

The reducer comprises further an eccentric rotor 12 driven in its movements by means of an eccentric 13 fast with the motor shaft 1. This eccentric rotor 12 comprises three radial arms 14, symmetrically located with respect to the center of the rotor, each carrying two pins 15, 16; 17, 18 and 19, 20 constituting pairs of actuating members. During the displacements of the rotor, the actuating members 15, 17 and 19 cooperate with the notches 10 of the bearer reduction members 6 whereas the actuating members 16, 18 and 20 cooperate with the notches 11 of the driven reduction member 7.

During the movements of the rotor 12, the pairs of actuating members 15, 16; 17, 18; 19, 20 successively cooperate with all the notches 10, 11 of the reduction members 6, 7. However, not more than two pairs of actuating members simultaneously mesh with the notches 10, 11, the third pair being free.

Figure 3:
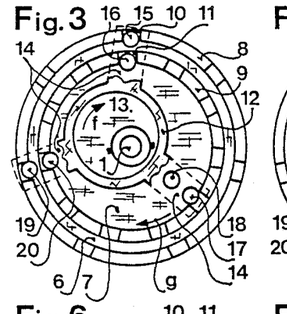
FIGS. 3 to 9 show the seven successive steps which are necessary to cause the rotation by 1/11 of a turn of the internal driven reduction member with respect to the external bearer reduction member.

In its position shown in FIG. 3, the eccentric 13 is driven in the direction of the arrow f, the pair of actuating members 15, 16 just penetrates into a notch 10, respectively 11 of the reduction members 6, 7, whereas the pair of actuating members 19, 20 just leaves a notch 10, respectively 11 and the pair of actuating members 17, 18 is free of all notches 10, 11.

Figure 4:
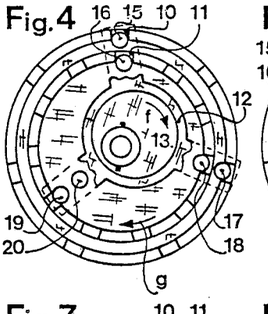
Figure 5:
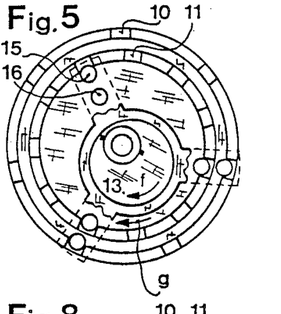
Figure 6:
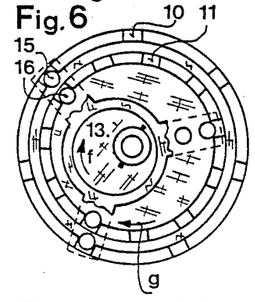
Figure 7:
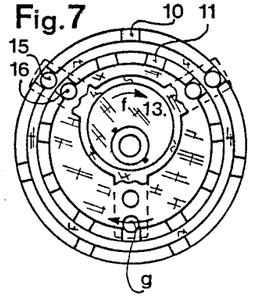
Figure 8:
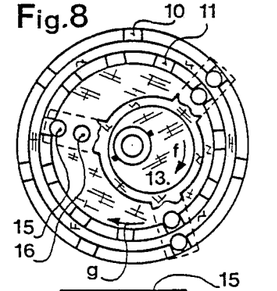

When the rotor 12 passes from its position shown in FIG. 3 to its position shown in FIG. 4, driven by the motor shaft 1, it effectuates in fact an instantaneous pivoting around the actuating member 15 maintained in the notch 10 of the bearer reduction member 6 which is thus angularly fixed, in which it is located. This instantaneous pivoting causes a driving in rotation of the notch 11 of the driven reduction member meshing with the actuating member 16 in the direction of the arrow g. During this movement of the rotor, the pair of actuating members 19, 20 has come out of the notches 10, 11 and at the end of said movement or step of the rotor 12 the pair of actuating members 17, 18 enters into the notches 10, respectively 11 at the time the actuating members 15, 16 leaves the notches 10, 11 with which they were cooperating.

During this unitary movement or step of the rotor, the angular displacement of the driven reduction member 7 is in this example 1/77 of a revolution.

Two revolutions of the motor shaft 1 are necessary for one of the arms 14 of the rotor 12 to come back in the position shown in FIG. 3.

Figure 9:
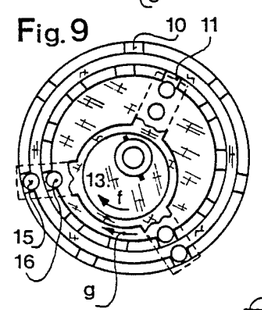

After seven successive steps the driven reduction member 7 has effectuated 1/11 of a revolution as can be seen from the position of the corresponding notches 10, 11 in FIGS. 3 and 9.

The amplitude of the rotation for each step of the rotor 12 of the internal reduction member 7 depends on the distance separating the axes of the actuating members on a same pair and of the angular amplitude of the instantaneous pivoting of the rotor around the actuating member meshing with the corresponding notch 10.

It goes without saying that it is not possible to arbitrarily choose the number of notches 10 and 11 as well as the number of pairs of actuating members since it is necessary that at very precise points of the movement, notches 10, 11 be aligned in order that a pair of actuating members is able to enter them.

The number of notches 10, 11 of the reduction member 6, 7 is given by the following equation:

$$N_1 = \frac{a \cdot N_2 - n}{N_2 \cdot in} + b \cdot N_2 \qquad \text{I}$$

in which:

$N_1$ is the number of notches 10 of the bearer reduction member, here the outside reduction member 6.
a is a whole number which is equal or superior to 1.
n is a whole number which is equal or superior to 1.
b is a whole number which is equal to or higher than 0.
$N_2$ is the number of driving elements 11 of the driven reduction member, here the internal reduction member 7.
$N_2 \cdot in$ is the number of driving elements of the driven reduction member, here the reduction member 7, located between two actuating members 16, 18, 20 belonging to different pairs meshing with this driven reduction member 7.

In the case described above, one sees, that if $N_2=11$; $N_2 \cdot in = 3$; $a=2$; $n=1$ and $b=0$ that:

$$N_1 = \frac{2 \cdot 11 - 1}{3} = 7$$

and the reduction ratio:

$$R = 2 \cdot 11 = 22 \text{ if } N_1 \cdot in = 2$$

This is in conformity with the embodiment shown wherein the driven reduction member 7 comprises eleven notches 11 and the bearer reduction member 6 seven notches 10.

It is also possible to express the number of driving elements of the driven reduction member as a function of the number of driving elements of the bearer reduction member as follows:

$$N_2 = \frac{c \cdot N_1 + n}{N_1 \, in} + d \cdot N_1 \qquad \text{Ia.}$$

wherein c and d are whole numbers.

In the case of the first embodiment described one has:

$$c=1; n=1; d=1; N_1=7$$

$N_1 in = 2$ that is $$N_2 = \frac{7+1}{2} + 7 = 11$$

this corresponds to the embodiment shown in FIGS. 3 to 9.

It has been seen in this first embodiment that it was necessary to complete two revolutions of the motor shaft 1 to cause an angular displacement of the driven reduction member 7 of 1/11 of a revolution. The reduction member 7 being here fast with the output shaft 5 the reduction ratio of this reducer is thus $R=22$.

This reduction ratio can be expressed in a general manner by the equation:

$$R = \frac{N_1 in \cdot N_2}{n}, \text{ wherein}$$

$N_1 in$ is the number of driving elements of the bearer reduction member 6 located between two actuating members belonging to different pairs meshing with this reduction member, here 2, $N_2$ is the number of driving elements of the driven reduction member 7, that is 11, and n is a whole number, here 1.

In the case shown the reduction ratio is equal to:

$$R = \frac{2 \cdot 11}{1} = 22$$

By modifying the number of driving elements of the reduction members 6, 7 as well as the number of the driving elements of the bearer reduction member located between two pairs of actuating members of the rotor it is possible to realize a great number of different ratios.

This even more true in that it is possible to vary the number n. So if the following values are given:

$$N_2 = 15; N_2 in = 4; N_1 in = 5$$

$$a = 1; n = 3; \text{ and } b = 1$$

one has then:

$$N_1 = \frac{1 \cdot 15 - 3}{4} + 1 \cdot 15 = 18 \qquad \text{I}$$

and the reduction ratio is:

$$R = \frac{5 \cdot 15}{3} = 25$$

As non-limiting examples one can cite the following values which all respond to the formulas I and Ia given above:

TABLE I

| $N_1$ | $N_2$ | $N_1$in | $R = \frac{N_2 \cdot N_1 in}{n}$ | $N_2$.in | n |
|---|---|---|---|---|---|
| 7 | 11 | 2 | 22 | 3 | 1 |
| 18 | 11 | 5 | 55 | 3 | 1 |
| 29 | 11 | 8 | 88 | 3 | 1 |
| 4 | 17 | 1 | 17 | 4 | 1 |
| 21 | 17 | 5 | 85 | 4 | 1 |
| 38 | 17 | 7 | 153 | 4 | 1 |
| 11 | 15 | 3 | 45 | 4 | 1 |
| 26 | 15 | 7 | 105 | 4 | 1 |
| 41 | 15 | 11 | 165 | 4 | 1 |
| 18 | 15 | 5 | 25 | 4 | 3 |

It goes without saying that not all combinations of arbitrary values for the factors a, b, c, d and n can lead to realizations which can be built, as it is further necessary to satisfy to the condition that the numbers of driving elements $N_1$ and $N_2$ as well as the corresponding numbers $N_1$·in and $N_2$·in be whole numbers. Nevertheless as seen in the Table I which is far from being exhaustive, very numerous executions are possible leading to a multitude of different reduction ratios.

In this embodiment wherein the bearer reduction member 6 is outside the driven reduction member 7, the motor shaft 1 and the driven reduction member 7 revolve in the same direction. The rotor 12 revolves in the reverse direction.

The second embodiment of the mechanical reducer shown in FIGS. 10 to 20 comprises a motor shaft 1 driving a rotor 12, identical to the rotor 12 of the first embodiment comprising pairs of actuating members 15, 16; 17, 18; 19, 20, cooperating, as in the first embodiment, with driving elements having the shape of notches 10, 11 carried by the reduction members 6, 7 respectively. As in the first embodiment, the outside reduction member comprises seven notches 10 whereas the inside reduction member comprises eleven notches 11.

The only difference of this embodiment from the first embodiment resides in the fact that the bearer reduction member, angularly fixed, is here the internal reduction member 7 and that the driven reduction member is the external reduction member 6. Furthermore, the motor shaft 1 and the eccentric 13 revolve in the reverse direction from the driven reduction member 6. The rotor 12 revolves in the same direction as the driven reduction member 6.

In this case, wherein the directions of rotation of the eccentric 13 and the driven reduction member 6 are reversed the equation permitting the determination of the number of driving elements of the reduction members is:

$$N_1 = \frac{e \cdot N_2 + n}{N_2 \cdot in} + f \cdot N_2 \text{ wherein} \qquad \text{II.}$$

e is a whole number equal or superior to 1
n is a whole number equal or superior to 1
f is a whole number equal or superior to 0 and wherein the symbols have the same significance as before.

In the case of the second embodiment one has:

$$e = 1; n = 1; f = 1; N_2 in = 2 \text{ and } N_2 = 7$$

and thus $$N_1 = \frac{1 \cdot 7 + 1}{2} + 1 \cdot 7 = 11$$

and the reduction ratio $$R = N_1 in \cdot N_2 \text{ with } N_1 in = 3 \text{ that is}$$

$$R = 3 \cdot 7 = 21$$

in the recited case, one sees that if f=0 the number of driving elements $N_1$ of the bearer reduction member would be only four.

$$N_1 = \frac{7 + 1}{2} = 4$$

in this case $N_1$in would be equal to one and the reduction ratio would then be $$R = 1 \cdot 7 = 7$$

Here also, one can express the number of driving elements of the driven reduction member as a function of the number of driving elements of the bearer reduction member.

$$N_2 = \frac{g \cdot N_1 - n}{N_1 in} + h \cdot N_1 \text{ wherein} \qquad \text{IIa.}$$

g and n are whole numbers equal or greater than 1, and h is a whole number equal to or greater than 0.

In the case of this second embodiment one has:

$$N_1 = 11; N_1 in = 3; g = 2; n = 1 \text{ and } h = 0.$$

and:

$$N_2 = \frac{2 \cdot 11 - 1}{3} = 7$$

which corresponds to the embodiment shown in FIGS. 10 to 20.

One sees therefore that for reducers the rotors of which are identical as well as the number of driving elements of the reduction members reduction ratios differing from one unit are obtained depending on whether the bearer reduction member is the external member or the internal member.

In this second embodiment it is necessary to make eleven successive steps to realize one cycle of the rotor and in order that the driven reduction member makes 1/7 of a revolution with respect to the fixed bearer reduction member. As can be seen in FIGS. 10 to 20 three turns of the motor shaft are necessary to make the eleven steps of the rotor.

Here also one can give an example wherein n would be different from 1 as before. Thus if one takes the following values:

$$N_2 = 18; N_2 \cdot in = 5; N_1 in = 4$$

$$e = 4; n = 3 \text{ and } f = 0$$

one then has:

$$N_1 = \frac{4 \cdot 18 + 3}{5} = 15 \qquad \text{II.}$$

and the reduction ratio is:

$$R = \frac{18 \cdot 4}{3} = 24$$

Here also in the case wherein the bearer reduction member is the external member 6, it can be noted that very numerous reduction ratios can be realized which as in the preceeding case all satisfy to the equation II or IIa.

TABLE II

| $N_1$ | $N_2$ | $N_1 in$ | $R = \dfrac{N_2 \cdot N_1 in}{n}$ | $N_2 in$ | $n$ |
|---|---|---|---|---|---|
| 11 | 7  | 3 | 21  | 2  | 1 |
| 11 | 18 | 3 | 54  | 5  | 1 |
| 11 | 29 | 3 | 87  | 8  | 1 |
| 17 | 4  | 4 | 16  | 1  | 1 |
| 17 | 21 | 4 | 84  | 5  | 1 |
| 17 | 38 | 4 | 152 | 7  | 1 |
| 15 | 11 | 4 | 44  | 3  | 1 |
| 15 | 26 | 4 | 104 | 7  | 1 |
| 15 | 41 | 4 | 164 | 11 | 1 |
| 15 | 18 | 4 | 24  | 5  | 3 |

It is interesting to note that whatever the particular realization of the reducer is with one of the two reducing members fixed, the reduction ratio is always a whole number.

Figure 10:
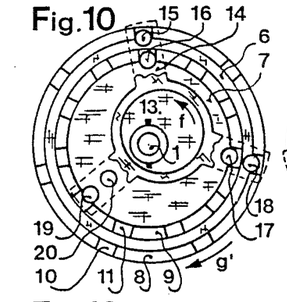
FIGS. 10 to 20 show the eleven steps which are necessary to cause the rotation by 1/7 of turn of the external driven reduction member with respect to the internal bearer reduction member.
Figures 11, 12:
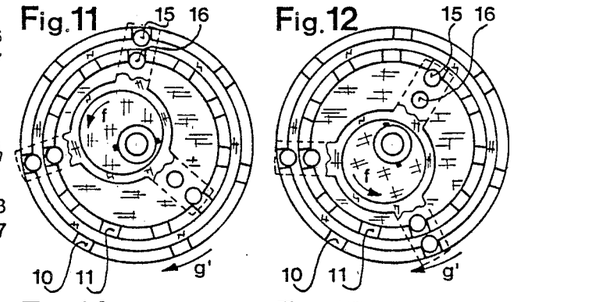
Figure 13:
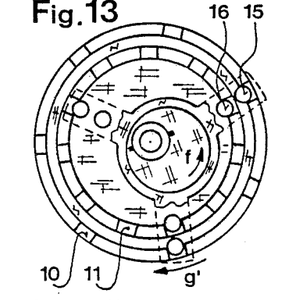
Figure 14:
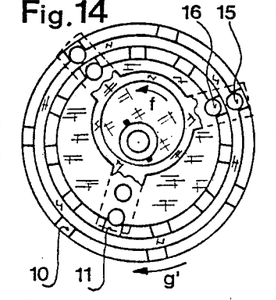
Figure 15:
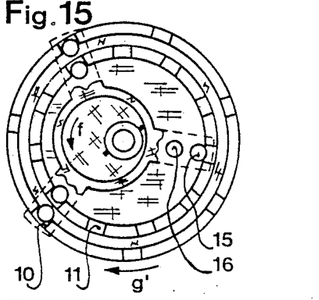
Figure 16:
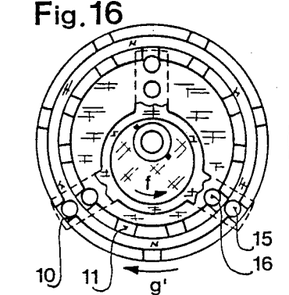
Figure 17:
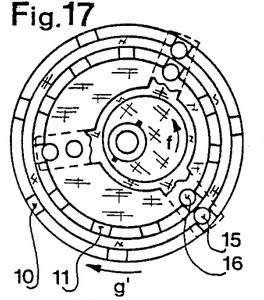
Figure 18:
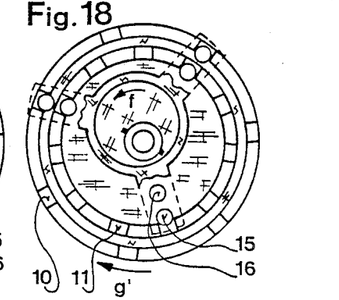
Figure 19:
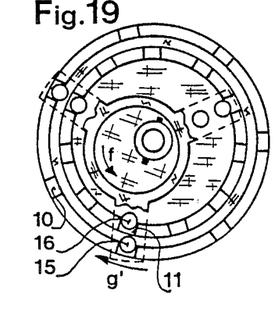
Figure 20:
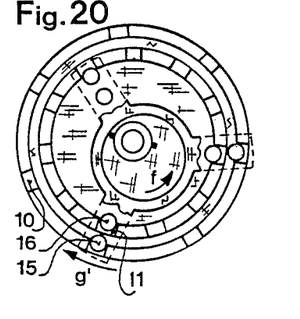
Figure 21:
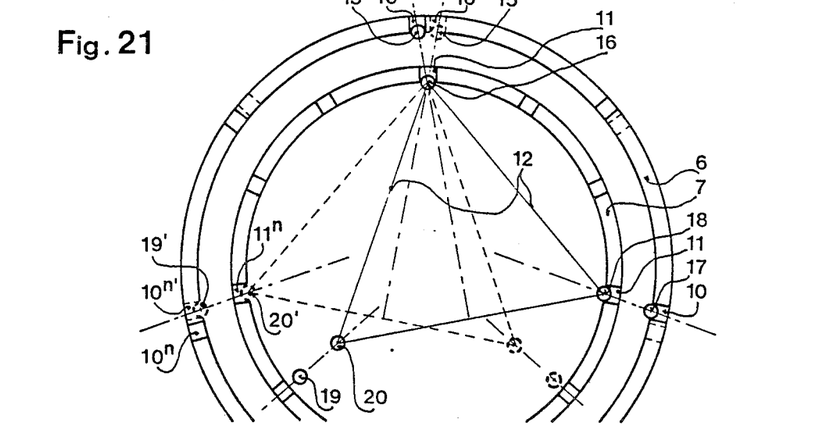
FIG. 21 shows graphically the instantaneous pivoting of the rotor of the reducer.

FIG. 21 shows schematically the instantaneous pivoting of the rotor causing the driving by one step of the outside driven reduction member 6, that is in the case of the second embodiment described, by the passage from the position shown in FIG. 10 to that shown in FIG. 11.

The rotor 12 is symbolyzed by a triangle the spices of which carry the pairs of actuating members 15, 16; 17, 18 and 19, 20.

At the moment the actuating member 18 leaves the notch 11 of the bearer reduction member 7 and the actuating member 17 leaves the notch 10 of the driven reduction member 6, the actuating members 15, 16 enter the notches 10' respectively 11 of the reduction members 6, 7 which have been placed by the preceeding step of the rotor 12 the one in front of the other.

During the next step of the movement of the rotor, the rotor moves from the position shown in full lines to the position shown in dashed lines through an instantaneous pivoting around the center of the actuating member 16 maintained in the notch 11 of the bearer reduction member 7. During this pivoting only the pair of actuating members 15, 16 is mesh with the reduction members 6, 7 the actuating member 16 being fixed, its axis serving as pivot axis for the rotor 12, whereas the actuating member 15, meshing with the notch 10' drives it to its position shown in dashed lines 15', 10". At this moment a notch 10 of the driven reduction member has arrived at 10' in a position in which it is located in front of a notch 11 of the reduction member 7.

Thus, the driven reduction member 6 has been displaced by an angular value $\alpha$ during this instantaneous rotation of the rotor 12 around the axis of the actuating member 16. At the moment the actuating member 15 arrives at 15' and leaves the notch 10" the actuating members 19, 20 arrive at 19' and 20' ready to engage in a notch $10^{n'}$ and $11^n$. A new step is then made by an instantaneous pivoting of the rotor 12 around its actuating member 20.

In the two embodiments described one of the reduction members is fixed and serves as bearer during the instantaneous pivoting of the rotor to cause the driving of the other reduction member. In these cases the point around which the instantaneous pivoting of the rotor is effectuated is the axis of the actuating member of the rotor which is at that time mesh with a driving element of the bearer reduction member.

The principal advantages of the mechanical reducer according to the invention are:

1. A reduced number of parts the machining of which is easy and can be realized with precision.

2. The obtention of whole number reduction ratios.

3. The possibility of providing a great number of reduction ratios.

4. The possibility, in a small space to realize a high reduction ratio and still transmit a high torque.

5. Due to the fact that the movement is reduced in a great number of unitary steps, the precision is enhanced and wear is reduced. In fact, each step is positioned and locked by the meshing of one pair of actuating members in a corresponding pair of driving elements.

Considering for example a reducer corresponding to the line 5 of Table II, it is necessary to have $17 \times 38 = 646$ steps for one revolution of the driven member.

The precision of each of these steps is given by the interaction of a pair of actuating members with the pair of driving elements and there is no possibility of increasing the existing play.

In variants which are not shown, one can provide that the two reduction members namely the bearer member and the driven member be both angularly displaceable and connected through a permanent kinematic connection other than the rotor. This kinematic connection may for example be formed by a pinion pivoted on the housing and meshing with teeth carried each by one of the reduction members. In such a realization, the reduction members displace angularly in reversed directions during the operation. Due to this movement of the two reduction members, the instantaneous pivoting of the rotor, bearing on the bearer reduction members and driving the driven reduction member, takes place around a point located on a line connecting the centers of the two actuating members of the pair which is mesh with the reduction members.

Therefore, in a very general manner the equation permitting determining the number of driving elements of the bearer reduction member is:

$$N_1 = \frac{V \cdot N_2 \mp n}{N_2 in} + X \cdot N_2 \text{ wherein}$$ III.

V and n are whole numbers equal or superior to 1, and X is a whole number equal to or higher than 0, the symbols having the same significance as before and the sign which is used in the numerator of the first term of this equation being a minus sign when the eccentric revolves in the same direction as the driven reduction member and a plus sign when they revolve in reversed direction from each other.

One can also express $N_2$ as function of $N_1$ which gives the equation:

$$N_2 = \frac{Y \cdot N_1 \pm n}{N_1 in} + Z \cdot N_1$$ IIIa.

wherein Y and n are whole numbers equal to or higher than to 1, Z a whole number equal or higher than 0 and the symbols have the same significance as before and wherein the sign used in the numerator of the first term of this equation is a plus sign when the eccentric revolves in the same direction as the driven reduction member and a minus sign when they revolve in reversed direction from each other.

It is to be noted that in these equations I, II and III or Ia, IIa, and IIIa if $N_2$ is divisible by $N_2$in respectively that $N_1$ is divisible by $N_1$in it is impossible to satisfy the relation, that is it is not possible to realize a reducer with the choosed numbers. In fact, all these numbers have to be whole numbers.

Figure 22:
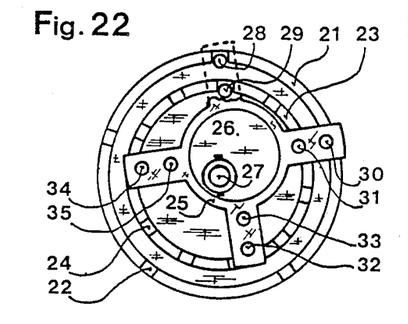
FIG. 22 shows a third embodiment of the reducer comprising a rotor having four arms.

The third embodiment of the mechanical reducer shown in FIG. 22 comprises an outside reduction member 21 presenting five driving elements 22 and an internal reduction member 23 presenting eleven driving elements 24. A rotor 25 driven by an eccentric 26 fast with a motor shaft 27 comprises four arms carrying each a pair of actuating members 28, 29; 30, 31; 32, 33 and 34, 35 cooperating successively with the driving elements 22, 24 of the reduction members 21, 23.

In this embodiment it is to be seen that the number of driving elements 22 and 24 is in conformity with the general equation III when the outside reduction member 21 is the bearer member.

$$N_1 = \frac{V \cdot N_2 - n}{N_2 \cdot in} + X \cdot N_2, \text{ a minus sign is}$$

used since the driven reduction member revolves in the same direction as the eccentric. if V=1; X=0; and n=1 one has:

$$N_1 = \frac{11 - 1}{2}$$

that is 5

The reduction ratio is in this case $$R = N_1 \cdot N_2 \cdot in = 5 \cdot 2 = 10$$

If one considers that the bearer reduction member is the internal member 23 one has:

$$N_1 = \frac{V \cdot N_2 + n}{N_2 \cdot in} + X \cdot N_2, \text{ a plus sign is}$$

used since the driven reduction member revolves in the reversed direction from the eccentric and if:

$$V = 1; X = 1; \text{ and } n = 1 \text{ one has:}$$

$$N_1 = \frac{5 + 1}{1} + 5 = 11$$

and the reduction ratio is $$R = N_1 \cdot N_2 \cdot in = 11 \cdot 1 = 11$$

Figure 23:
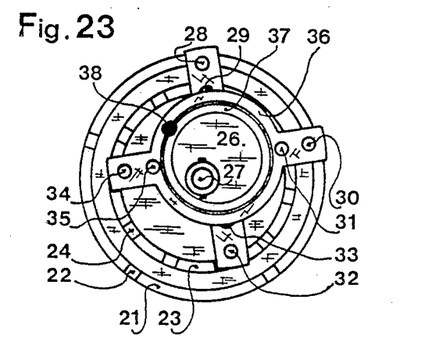
FIG. 23 shows a variant of the reducer shown in FIG. 22.

FIG. 23 shows a variant of the mechanical reducer shown in FIG. 22 in which the rotor driven by the motor shaft 27 and the eccentric 26 is constituted by two parts 36, 37 mounted one on the other and having each two arms carrying the actuating members 28, 29 and 32, 33 respectively 30, 31 and 34, 35.

These two parts 36, 37 are able to displace angularly the one with respect to the other against the action of a resilient member 38.

This realisation is particularly advantagous since it is possible to adjust with precision the diameter of the pins forming the actuating members of the rotor to the width of the notches forming the driving members of the reduction members so that the driving takes place without play. In fact, thanks to the elasticity between the successive actuating members, their introduction in the corresponding notches is made without shock even if the tolerances are very tight.

Figure 24:
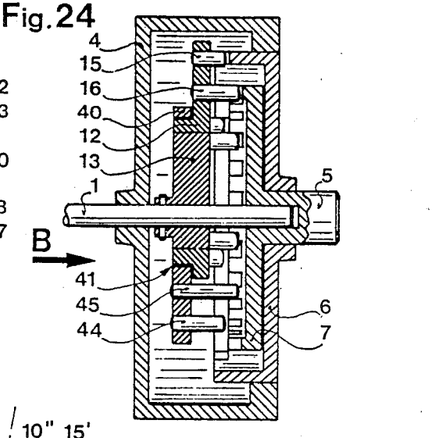
FIG. 24 is a view in axial cross section of a fourth embodiment of the reducer having two rotors.
Figure 25:
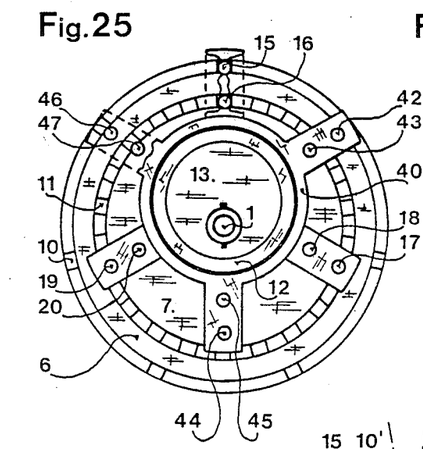
FIG. 25 is a view from B of the reducer shown in FIG. 24, the housing being omitted.

The fourth embodiment shown in FIGS. 24 and 25 constitutes in fact a variant with two rotors of the reducer shown in FIGS. 1 to 9. In fact, this mechanical reducer comprises a motor shaft 1, an output shaft 5, a housing 4, two reduction members 6, 7 and an eccentric 13 as well as a rotor 12 as in the first embodiment.

A second rotor 40 having three arms also is pivoted on an annular surface 41 of the first rotor 12, concentrically to the eccentric 13. The arms of the second rotor extend along lines bisecting the angles formed by the arms of the first rotor 12. The arms of this second rotor carry also pairs of actuating members 42, 43; 44, 45; and 46, 47 cooperating with the notches 10, 11 of the reduction members.

One sees however that the bearer reduction member, here the outside member 6, comprises seven notches 10, as in the first embodiment, but that due to the presence of the second rotor 40, angularly displaced with respect to the first rotor 12, the number of notches 11 of the driven reduction member 7 is doubled, but this has no influence on the operation or on the reduction ratio of the reducer. The two rotors operate independently and this has to be taken in account when calculating this reducer.

One of the advantages of such a realization resides in the increase of the torque which can be transmitted by the reducer, due to the fact that there are always two pairs of actuating members, one for each rotor, which mesh with the reduction members.

Figure 26:
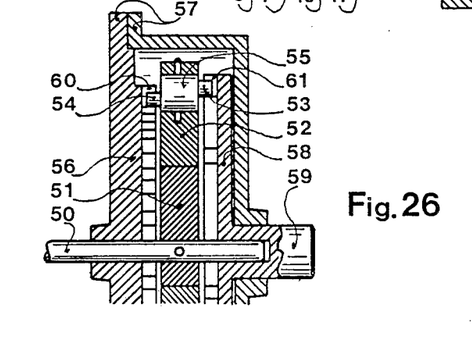
FIG. 26 is a partial axial cross section of a fifth embodiment of the reducer.

FIG. 26 shows a fifth embodiment of the reducer comprising an input shaft 50 fast with an eccentric 51 driving a rotor 52 comprising at least three pairs of actuating members. In this embodiment, each pair of actuating members 53, 54 is constituted by a cylindrical stud fast with a trunnion 55 driven or keyed in a hole of the rotor 52. In this way the studs are located on opposed lateral faces of the rotor and the distance separating their axes can be very small without reducing their dimensions and thus their to compactness.

This reducer comprises further a bearer, fixed, reduction member 56 constituted by one of the lateral walls of the housing 57 and a driven reduction member 58 pivoted on the input shaft 50 and constituting an output shaft 59. The driving elements of the reduction members 56, 58 are constituted by radial milled notches 60, 61 respectively.

The operation of this reducer is the same as that of the previous embodiments but enables through its construction to providing a very slow forward motion for each step of the driven reduction member and thus a very great reduction ratio still permitting the transmission of high torques.

It is evident that in the five described embodiments of the reducer it is possible to provide one or several equilibrating masses, fast with the motor shaft and with the eccentric in order to dynamically equilibrate its parts which are in rapid rotation.

Figures 27, 28, 29:
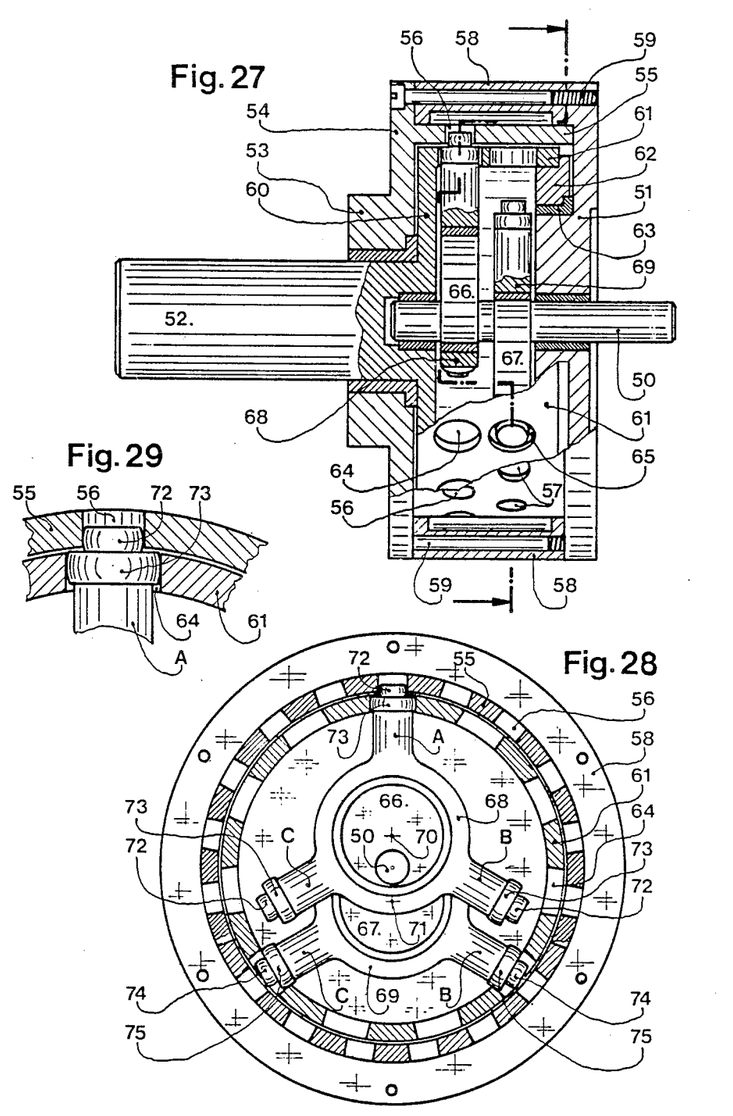
FIG. 27 is an axial cross section of a sixth embodiment of the reducer.
FIG. 28 is a side view of the reducer shown in FIG. 27, the flange 51 and the crown 62 being omitted and the reduction members partially cut in the midplane of the first rotor and partially in the midplane of the second rotor.
FIG. 29 shows a detail on a greater scale of the driving elements and of the actuating members of this last embodiment.

The sixth embodiment of the reducer shown in FIGS. 27, 28, and 29 shows an industrial realization of it, particularly compact with a small size, comprising a limited number of pieces the manufacture of which is rendered very easy thanks to the design and their shapes which necessitates only easy machining such as boring or turning.

This realization corresponds to a reducer of the type of the second line of Table I, that is to say the principle characteristics of which are the following:

$N_1 = 18$; $N_1 in = 5$
$N_2 = 11$; $N_2 in = 3$
$R = 55$; $n = 1$

In this sixth embodiment the reducer comprises an input shaft or motor shaft 50 rotatable on the one hand in a fixed flange 51 and in the other hand in the end of an output shaft 52, coaxial with the motor shaft 50. This output shaft 52 is rotatable in the hub 53 of a bell 54, the cylindrical skirt 55 of which constitutes the fixed reduction member. This cylindrical skirt 55 is coaxial with the motor shaft 50 and output shaft 52 and comprises two rows of eighteen circular holes 56, 57, uniformly distributed on the periphery of this skirt, each row being disposed in a plane perpendicular to the shaft 50, 52. These holes 56, 57 constitute the driving elements of the fixed reduction member 53, 54, 55.

The reducer comprises further a housing 58 rigidly fixed and in a sealed manner by means of bolts 59 on the flange 51 and on an edge which the fixed reduction member 53, 54, 55 comprises.

The reducer comprises further a driven reduction member constituted by a bell 60 fast or of one piece with the driven shaft 52, the cylindrical skirt 61 of which is concentrically located within the skirt 55 of the fixed reduction member or bearer member 53, 54 55. The free end of this skirt 61 is fast with a ring 62 pivoted on a hub 63 provided on the fixed flange 51.

This skirt 61 of the driven reduction member 60, 61 comprises two rows of circular holes 64, 65 aligned on the plane containing the holes 56, 57 of the skirt 55 of the bearer reduction member and uniformly distributed on the periphery of this skirt 61. Each row of holes comprises eleven holes 64, 65, respectively constituting the driving elements of the driven reduction member.

The diameter of the holes 64, 65 is greater than that of the holes 56, 57.

The reducer comprises further two eccentrics 66, 67 fast with the motor shaft 50 angularly displaced by 180° and hence in opposition to each other and the median planes of which are aligned on the centers of the bores 56, 64 respectively 57, 65.

Rotors 68, 69 having three arms A, B, C are freely rotatable on these eccentrics 66, 67 respectively. These rotors 68, 69 are thus axialy displaced the one with respect to the other but are disposed in identical angular positions with respect to their respective centers of rotation 70, 71.

Each arm A, B, C of each rotor 68, 69 carries a pair of actuating members 72, 73, respectively 74, 75 formed by pins the peripheral surface of each of which is a slice of a sphere. The diameter of the slice of a sphere constituting the outside stud 72, 74 intended to cooperate with holes 56, 57 of the fixed reduction member 53, 54, 55 corresponds to the diameter of the holes 56, 57. The greater diameter of the slice of spheres constituting the inside pins 73, 75 intended to cooperate with the holes 64, 65 of the driven movable reduction member 60, 61 corresponds to the diameter of these holes 64, 65.

The difference between the diameter of the bores 56, 57 and 64, 65 is sufficient that during the operation of the reducer the pins 72, 74 may pass through the holes 64, 65 before cooperating with the holes 56, 57.

A certain quantity of oil is located in the inside space of the housing 58 in order to lubricate all the surfaces in relative movement, namely the bearings and actuating members during the operation of the reducer.

This sixth embodiment of the reducer operates according to the same principle as the preceedingly described embodiments. It has however the supplemental advantages listed hereunder:

1. The masses which are in movement are equilibrated since the rotors 68, 69 are in opposition.

2. The actuating members carried by the arms of the rotors are not subjected to any moment since the forces which are applied to them pass through their respective axes. This is also true for the driving elements of the reduction members.

In variants of this embodiment the pins and the holes with which they cooperate could have different shapes. For example the pins could be replaced by rollers and the holes by rectangular slots of corresponding dimensions.

In other variants, the reducer could comprise several rotors, three, four or more, freely rotatable each on an eccentric fast with the motor shaft. The eccentrics are angularly displaced with respect to each other, preferably in such a manner as to be uniformly distributed around the motor shaft.

In a general way, it is to be noted that this reducer is reversible, that means that it is possible to reverse the functions of the input shaft and of the output shaft to obtain a multiplier instead of a divider. It is true that for high multiplication ratios the motor torque could be prohibitive.

Finally the reducer is symmetrical, that is to say that the input shaft may be driven either in one direction or in the other, causing also a reversal of the direction of rotation of the output shaft.

In variants, the actuating members could be constituted by slots or milled formations and the driving elements by pins, teeth and so on. For the good working of the reducer it is necessary that the actuating members and the driving elements mesh without play whatever is their shape.

It is further to be noted that in a reducer according to the invention, the eccentric makes a relatively great angular movement for each step so that any play of the eccentric on the motor shaft or of the rotor on the eccentric is practically not communicated to the output shaft.

Finally it is to be noted that the determinant constructive advantages are obtained such as reduction of the volume of the reducer, reduction of the number of parts and of the amount of machining, and greater precision, when the value $N_1$in and/or of $N_2$in is equal to or higher than two.

These reducers may be used in numerous technical fields such as robotic, machines for agriculture, machine tools, timed mechanisms, analogical displays, micromechanics, instruments and apparatus for measurement, transmissions and so on.

I claim:

1. Mechanical reducer comprising a driving member and a driven member revolving at different angular speeds depending from the reduction ratio of the reducer, comprising two reduction members, coaxial with the driving and driven members, angularly displaceable the one with respect to the other, each comprising a series of driving elements uniformly distributed and concentric with the corresponding reduction members, the two said series having different numbers of driving elements; at least one eccentric rotor driven by at least one eccentric fast with the driving member; said rotor comprising at least three pairs of actuating members uniformly distributed around its center and each actuating member of a pair being located in one of two circles having two different diameters and concentric to said rotor, the actuating members of each said pair being radially aligned with respect to the center of the rotor, the number of said actuating members of the rotor located on each of said circles being equal, one of the actuating members of each said pair cooperating with the driving elements of one of the reduction members, the other actuating member of each pair cooperating with the driving elements of the other reduction member.

2. Reducer according to claim 1, characterized by the fact that the reduction members are constituted by two concentric cylindrical elements surrounding the rotor or the rotors and by the fact that the driving elements of these reduction members are constituted by holes.

3. Reducer according to claim 2, characterized by the fact that the said holes are circular and that the diameter of the holes of the internal reduction members is greater than that of the holes of the outside reduction member.

4. Reducer according to claim 3, characterized by the fact that each pair of actuating members comprises two coaxial pins the diameter of which corresponds to the diameters of the holes of the corresponding reduction members.

5. Reducer according to claim 4, characterized by the fact that each of the pins has a peripheral surface having the shape of a slice of sphere.

6. Reducer according to claim 1, characterized by the fact that it comprises two rotors movable independently relative to each other, the pairs of actuating members of the rotors being intercalated between said driving elements and by the fact that the number of driving elements of at least one reduction member is doubled.

7. Reducer according to claim 6, characterized by the fact that the two rotors are driven by a motor shaft through the same eccentric.

8. Reducer according to claim 6, characterized by the fact that each rotor is driven by the motor shaft by means of an eccentric.

9. Reducer according to claim 8, characterized by the fact that the rotors are located in parallel planes and that the actuating members of each rotor cooperate with corresponding driving elements of each reduction member.

10. Reducer according to claim 8, characterized by the fact that the eccentrics are in opposition.

11. Reducer according to claim 1, characterized by the fact that the reduction members are both movable and connected between them by a kinematic linkage which is independant from the rotor.

12. Reducer according to claim 1, characterized by the fact that two adjacent pairs of actuating members of a rotor are connected between them by means of a device effecting an angular displacement of the position of these pairs the one with respect to the other.

13. Reducer according to claim 1, characterized by the fact that it comprises only one rotor and that the number of driving elements of at least one reduction member is uneven.

14. Reducer according to claim 1, characterized by the fact that the driving elements of the reduction members are located in a plane perpendicular to the motor shaft, located on the same side of the rotor, the actuating members of this rotor extending perpendicularly from one of its lateral faces.

15. Reducer according to claim 1, characterized by the fact that it comprises several rotors each driven by an eccentric fast with a motor shaft and by the fact that these eccentrics are uniformly distributed around the said motor shaft.

* * * * *